(12) United States Patent
Matsuda

(10) Patent No.: US 7,890,303 B2
(45) Date of Patent: Feb. 15, 2011

(54) PARAMETER MANAGING METHOD, DESIGN PARAMETER MANAGING SYSTEM, PROGRAM AND COMPUTER READABLE RECORDING MEDIUM

(75) Inventor: Tatsuhiro Matsuda, Kanagawa (JP)

(73) Assignee: Zuken Inc., Yokohama-shi (JP)

( * ) Notice: Subject to any disclaimer, the term of this patent is extended or adjusted under 35 U.S.C. 154(b) by 809 days.

(21) Appl. No.: 10/588,376

(22) PCT Filed: Apr. 14, 2004

(86) PCT No.: PCT/JP2004/005306

§ 371 (c)(1),
(2), (4) Date: Jan. 26, 2007

(87) PCT Pub. No.: WO2005/076162

PCT Pub. Date: Aug. 18, 2005

(65) Prior Publication Data

US 2007/0276633 A1 Nov. 29, 2007

(30) Foreign Application Priority Data

Feb. 3, 2004 (JP) ................ 2004-026190

(51) Int. Cl.
G06F 17/50 (2006.01)
G06F 19/00 (2006.01)
G06G 7/48 (2006.01)

(52) U.S. Cl. ............ 703/1; 703/7; 700/95; 700/96; 700/97; 715/964

(58) Field of Classification Search ........ 703/1, 703/7; 715/964; 700/95
See application file for complete search history.

(56) References Cited

U.S. PATENT DOCUMENTS 6,542,937 B1 * 4/2003 Kask et al. ............ 719/328

(Continued)

FOREIGN PATENT DOCUMENTS

EP     1258821 A1 * 11/2002

(Continued)

OTHER PUBLICATIONS

Paul K. Wright et al. in "Management and Analysis of Design Constraints for Electronic-Mechanical Product Manufacturing", Transactions of the North American Manufacturing Research Institution, May 2002, vol. 30, pp. 703-710.*

(Continued)

Primary Examiner—Kamini S Shah
Assistant Examiner—Akash Saxena
(74) Attorney, Agent, or Firm—Birch, Stewart, Kolasch & Birch, LLP

(57) ABSTRACT

A system for managing design parameters in a plurality of different CAD systems flexible for the plurality of different CAD systems having essentially different design purposes. In a method for managing design parameters being used in a plurality of different CAD systems, respectively, in order to prevent prolongation of the completion time of the entire design of a product, arbitrary design parameters in the design parameters being used in the plurality of different CAD systems, respectively, are brought into a virtually shared state among the plurality of different CAD systems. Design parameters in the virtually shared state and design parameters not in the virtually shared state are managed independently.

8 Claims, 6 Drawing Sheets

U.S. PATENT DOCUMENTS

| | | | |
|---|---|---|---|
| 6,944,513 B1 * | 9/2005 | Tomomitsu et al. | 700/98 |
| 7,030,873 B2 * | 4/2006 | Matsuda | 345/419 |
| 7,467,372 B2 * | 12/2008 | Loughlin et al. | 717/106 |
| 7,676,348 B2 * | 3/2010 | Okada | 703/1 |
| 2002/0083082 A1 * | 6/2002 | Fujieda | 707/203 |
| 2002/0130869 A1 * | 9/2002 | Camiener et al. | 345/440 |
| 2003/0001839 A1 * | 1/2003 | Matsuda | 345/419 |
| 2006/0112376 A1 * | 5/2006 | Broberg et al. | 715/964 |
| 2007/0276633 A1 * | 11/2007 | Matsuda | 703/1 |
| 2008/0126023 A1 * | 5/2008 | Hoguet | 703/1 |

FOREIGN PATENT DOCUMENTS

| | | |
|---|---|---|
| GB | 2432239 A  * | 5/2007 |
| JP | 2001-202401 A | 7/2001 |
| JP | 2001202401 A  * | 7/2001 |
| JP | 2002-149720 A | 5/2002 |
| JP | 2003-44529 A | 2/2003 |

OTHER PUBLICATIONS

Hui-Fen Wang et al. In "CAD/CAM integrated system in collaborative development environment", Robotics and Computer Integrated Manufacturing, vol. 18, No. 2, Apr. 2002, pp. 135-145.*

"3 Jigen Kukan no Toriai o Smooth ni", Nikkei Digital Engineering, vol. 74, Jan. 15, 2004, p. 32.

Munetoshi Ito, "Unit Goto ni Kanren Buhin o Ichiran Hyoji", Nikkei Digital Engineering, vol. 49, Dec. 15, 2001, pp. 122-125.

"Kikai Sekkei to Denki Sekkei no Yugo ga Kasoku", Nikkei Digital Engineering, vol. 50, Jan. 15, 2002, pp. 110-112.

* cited by examiner

FIG. 2

| SHARED PARAMETER NAME | MECHANISM CAD INSTANCE NAME | ELECTRIC CAD INSTANCE NAME |
|---|---|---|
| PARTS ORIGIN | Pars Origin | Macro Origin |
| PARTS NUMBER | Part Number | PN |
| BOARD OUTLINE | Board | Board Layer |
| CONSTRAINT AREA | Constraint | Constraint Layer |
| MATERIAL | Material | E-Mat |

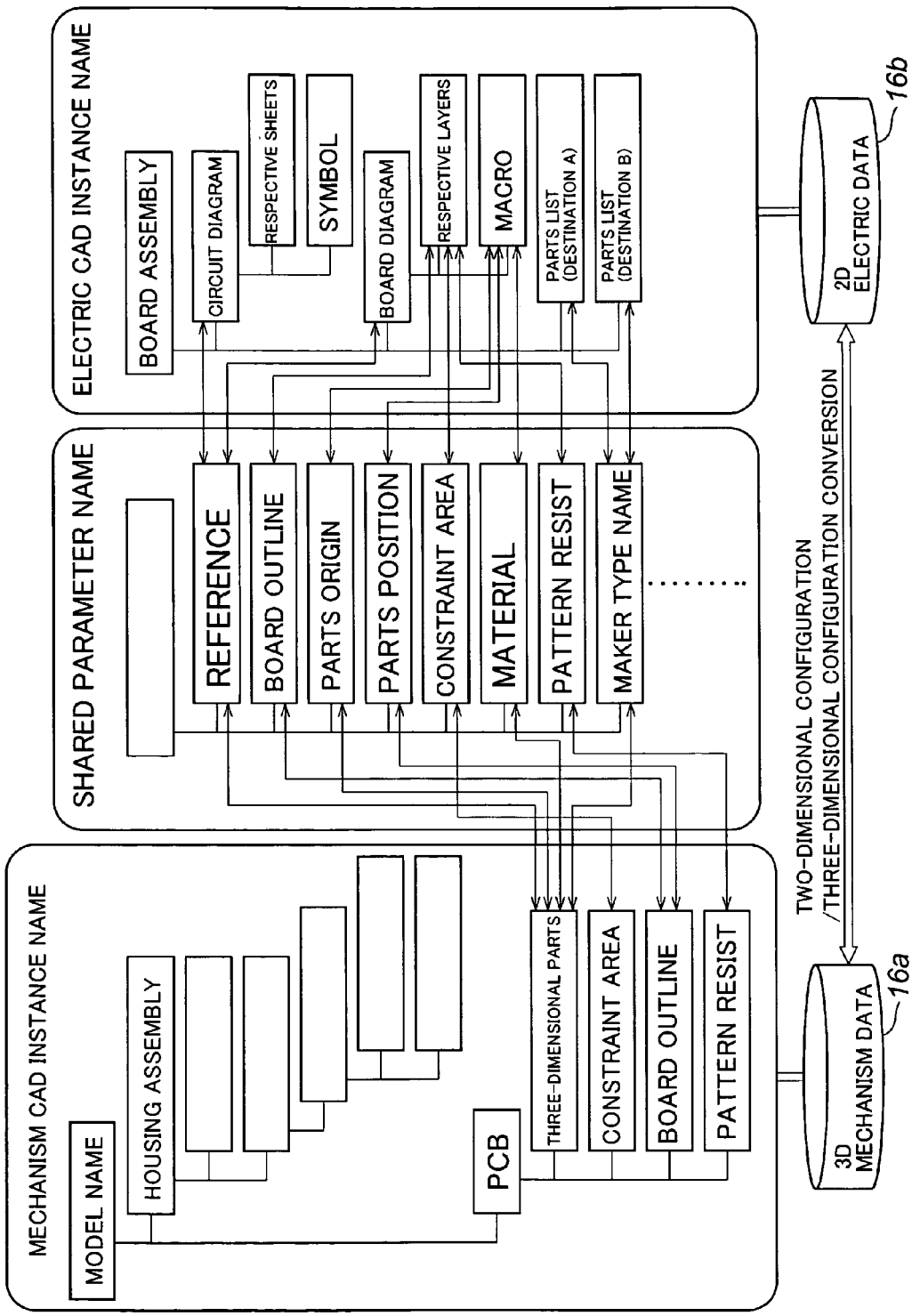

PARAMETER MANAGING METHOD, DESIGN PARAMETER MANAGING SYSTEM, PROGRAM AND COMPUTER READABLE RECORDING MEDIUM

TECHNICAL FIELD

The present invention relates to a design parameter managing method, a design parameter managing system, a program and computer readable recording medium, and more particularly to a design parameter managing method, a design parameter managing system, a program and computer readable recording medium, which are used suitably for managing the design parameters applied respectively in a plurality of different CAD systems.

In the present specification, a term "two dimension" and a term "three dimension" are referred optionally to as "2D" and "3D", respectively.

BACKGROUND TECHNOLOGY

In general, for example, in a three-dimensional product design (3D product design) carried out in a product development process of an electronic set manufacturer, a co-design manner wherein the design is allowed to go forward while associating an electrical packaging design conducted by using a two-dimensional CAD system (2D CAD system) with a mechanism and exterior design conducted by using a three-dimensional CAD system (3D CAD system) is adopted.

Incidentally, in a conventional co-design manner, the design parameters used in a three-dimensional CAD system applied in the mechanism and exterior design process (hereinafter referred optionally to as "three-dimensional mechanism CAD system") and the design parameters used in a two-dimensional CAD system applied in the electric packaging design process (hereinafter referred optionally to as "two-dimensional electric CAD system") are stored in one file under an integrated and centralized condition as three-dimensional mechanism data (3D mechanism data) and two-dimensional electric data (2D electric data), and they are managed in a condition wherein their own identification numbers (IDs) are assigned.

Accordingly, a mechanism designer who handles the three-dimensional mechanism CAD system and an electrical designer who handles the two-dimensional electric CAD system log on to the same numbering system, respectively; they are registered in a condition wherein their own required IDs are acquired, respectively; and afterwards, they put the design process into practice under the condition wherein they are managed on the integrated and centralized system.

In the above-described conventional management pattern, the constitution itself of the managing system of the design parameters in the three-dimensional mechanism CAD system and the two-dimensional electric CAD system is exactly unified. Thus, there is such an advantage that costs for the system architecture may be reduced, and in addition, the maintenance process therefor can be simplified as compared with the case wherein the three-dimensional mechanism CAD system has an independent managing system from that of the two-dimensional electric CAD system.

In the above-described conventional management pattern, however, involves such a problem that it is too poor in the flexibility as a system for backing up the whole processes carried out in originally different purposes of mechanism and exterior design and an electric packaging design as a result of unifying all the design parameters of the three-dimensional mechanism CAD system and the two-dimensional electric CAD system.

More specifically, in the above-described conventional management pattern, for example, design parameters suitable for creating a design in a state wherein the three-dimensional mechanism CAD system is independent from the two-dimensional electric CAD system must be kept under integrated management. In these circumstances, a numbering operation is conducted only for the purpose of creating a file and, thereafter, a copy of the file created in the numbering operation is separately stored and administered under a local machine directory, and after completing the design administered under a local directory and created under integrated management, the file stored and managed under the local machine directory is replaced by the file created in the above-described numbering operation.

Moreover, the above-described conventional management pattern involves such a problem that even a design product having no shared relationship between the three-dimensional mechanism CAD system and the two-dimensional electric CAD system so that they are independent from one another to be possible to complete early the design (hereinafter referred optionally to as "non-shared design product"), since there is no concept as to a shared/a non-shared relationship between the three-dimensional mechanism CAD system and the two-dimensional electric CAD system is dependent on the design completion of a design product having a shared relationship between the three-dimensional mechanism CAD system and the two-dimensional electric CAD system (hereinafter optionally referred to as "shared design product"), and thus, it results in prolongation of the time for completing the design of the whole product design.

It is to be noted that since the prior art known by the present applicant at the time of filing this application is the one as described in the above paragraphs and it is not the invention relating to that described in publicly known literary documents, there is no prior art technology information to be described herein.

DISCLOSURE OF THE INVENTION

The present invention has been made in view of the various problems involved in the prior art, and the objects thereof are to provide a managing system having sufficient flexibility with respect to a plurality of different CAD systems having originally different design purposes in case of managing design parameters in the plural different CAD systems as well as to provide a design parameter managing method, a design parameter managing system, a program and computer readable recording medium, and based on the provision of them, it becomes possible to suppress the prolongation of the time for completing the design of the whole product design.

In order to achieve the above-described objects, to the present invention, a virtual system concept of design parameters suitable for being shared in a plurality of different CAD systems (hereinafter referred optionally to as "shared parameters" in the present specification) such as arbitrary design parameters which are completed by accommodating design values to be correlated or the respective design values to each other in the plurality of different CAD systems, and the design parameters which are not suitable for being shared in the plurality of different CAD systems (hereinafter referred optionally to as "non-shared parameters" in the present specification) is introduced, and the shared parameters are managed independently from the non-shared parameters, whereby the managing system being sufficiently flexible with respect to the plurality of different CAD systems having originally different design purposes is realized; and further, it is arranged so as to complete early the design with respect to a design product having no shared relationship among the plurality of different CAD systems (non-shared design product) without depending upon a design product having a shared relationship among the plurality of different CAD systems (shared design product) and so as to be managed independently from the shared design product, so that a prolongation of the design completion time of the whole product design can be suppressed.

Namely, the design parameter managing method for managing design parameters used respectively in a plurality of different CAD systems according to the present invention is constituted such that arbitrary design parameters among the design parameters used respectively in the plurality of different CAD systems are made to be a virtually shared state among the plurality of different CAD systems; and the design parameters in the virtually shared state arc managed independently from the design parameters in no virtually shared state.

Furthermore, the design parameter managing system for managing design parameters used respectively in a plurality of different CAD systems according to the present invention is constituted so as to have a setup means for setting up arbitrary design parameters among the design parameters used respectively in the plurality of different CAD systems into a virtually shared state; and a managing means for managing independently the design parameters in the virtually shared state set up by the setup means from the design parameters in no virtually shared state.

Moreover, the design parameter managing system for managing design parameters used respectively in a plurality of different CAD systems according to the present invention is constituted so as to have a registration means for registering arbitrary design parameters among the design parameters used respectively in the plurality of different CAD systems as the shared parameters among the plurality of different CAD systems to a database; a history managing means for managing a history between the design parameters used respectively in the plurality of different CAD systems and the shared parameters registered to the database by means of the registration means; and a finite difference managing means for managing the finite differences between the design parameters used respectively in the plurality of different CAD systems and the shared parameters registered to the database by the registration means based on the history managed by the history managing means.

Still further, the design parameter managing system according to the present invention includes further a notification means for notifying the finite differences managed by the finite difference managing means to the plurality of different CAD systems.

Yet further, the design parameter managing system according to the present invention includes further a preparation means capable of preparing three-dimensional data in a condition wherein logical electric design information has been correlated to physical three-dimensional configuration information.

Moreover, the design parameter managing system according to the present invention includes further a means for preparing and managing an electronic parts data library which has been modeled in a three-dimensional configuration; and the three-dimensional electronic parts data library being arranged so as to have parts origin information and material physical property information and so as to correlate the parts origin information and the material physical property information with the shared parameters.

Still further, the present invention relates to a program for executing the design parameter managing method according to the present invention with respect to a computer.

Yet further, the present invention relates to a program to function a computer as the design parameter managing system according to the present invention.

Moreover, the present invention relates to a computer readable recording medium in which the program according to the present invention has been recorded.

The present invention as described above is applicable, for example, for a co-design of electrical packaging design and a mechanism exterior design in a three-dimensional product design which is principally executed in a product development process of electronic set manufacturers.

When a specific manner of use therefor is explained, for instance, a mechanism designer using the three-dimensional CAD system and an electrical equipment designer using the two-dimensional CAD system log on the design parameter managing system according to the present invention with the use of an ID managed by the system, and then, first, design parameters to be shared are set up from among the respective design parameters by using the functions involved in the system, whereby the design parameters to be used by a mechanism designer himself (or herself) or an electrical equipment designer himself (or herself) are separated independently into shared parameters and non-shared parameters. As a result, a design process proceeds in a co-design mode with respect to the shared parameters, while a design proceeds uniquely in the respective design processes in a mechanism exterior design process or an electrical packaging design process to complete the design with respect to the non-shared parameters.

In this case, it becomes possible to exchange more smoothly the mutual design concepts by such an arrangement that the mutual design progress in a co-design mode is directly monitored with respect to the shared parameters being the parameters shared by means of the two-dimensional CAD system and the three-dimensional CAD system, and further differential information in the shared parameters between the two-dimensional CAD system and the three-dimensional CAD system is allowed to reflect on the respective systems.

Furthermore, when electronic parts involving a large number of design parameters to be shared in the mechanism exterior design and the electrical packaging design are three-dimensionalized (converted into 3D data), and besides, the net information or pin information in the electrical packaging design, or physical properties of a material are made to be a library in a condition wherein attributes are applied, it becomes possible to more precisely analyze the analyzed results in case of mechanism exterior design.

Since the present invention is constituted as described above, the invention brings about such excellent advantages to provide a design parameter managing method, a design parameter managing system, a program and computer readable recording medium each of which has sufficient flexibility with respect to a plurality of different CAD systems having originally different design purposes in case of managing design parameters in the plural different CAD systems.

Furthermore, the present invention is constituted as described above, the invention brings about such excellent advantages to provide a design parameter managing method, a design parameter managing system, a program and computer readable recording medium, by each of which it becomes possible to suppress the prolongation of the time for completing the design of the whole product design.

BRIEF DESCRIPTION OF THE DRAWINGS

FIG. 2 is a table showing an example of an attribute correlation table;

FIG. 6 is an explanatory view showing a tree-structured attribute correlation table and a relationship of conversion between 3D mechanism data and 2D electric data.

Figure 1:
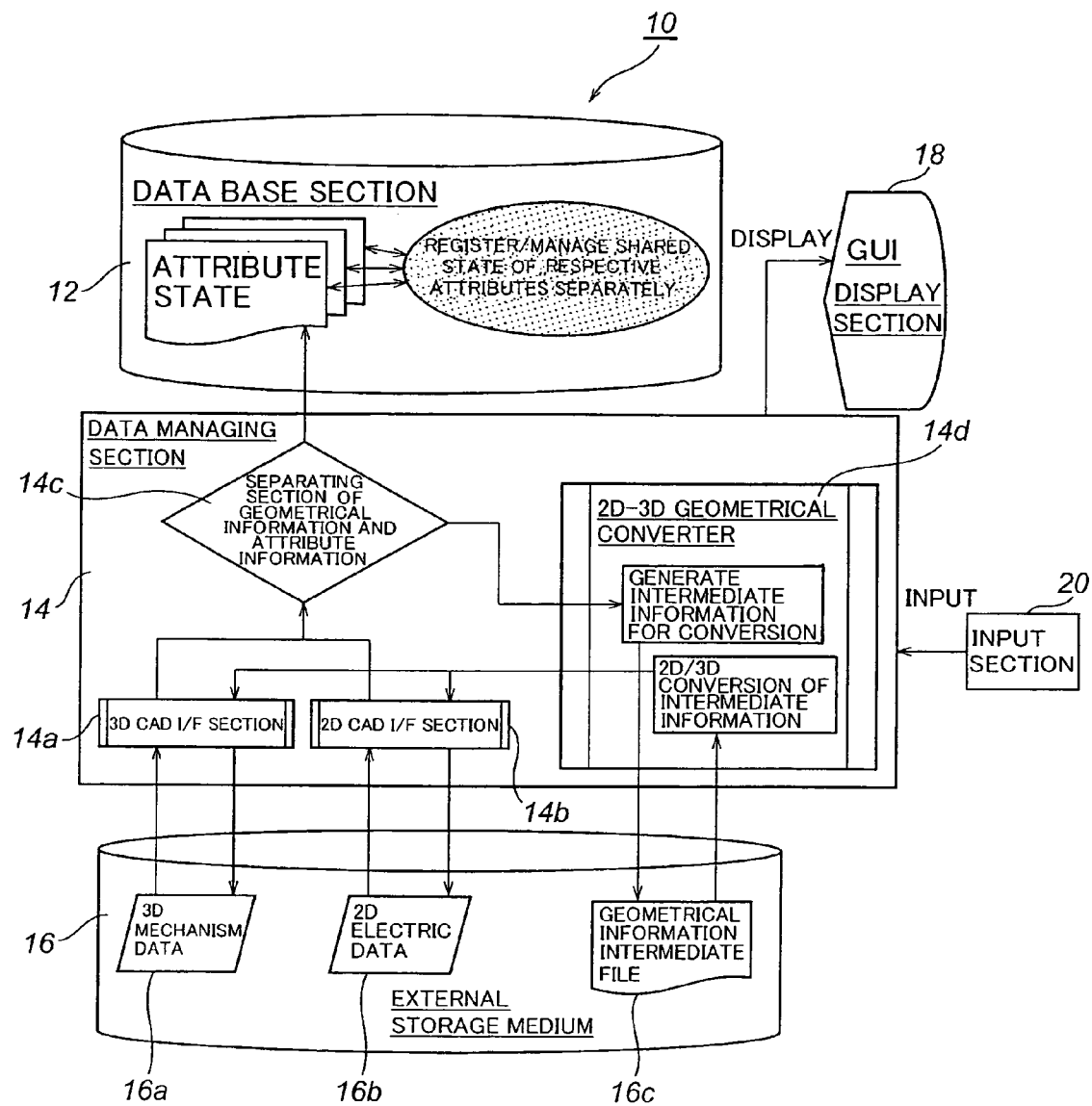
FIG. 1 is a constitutional block diagram showing the design parameter managing system according to an example of the manner of practice of the present invention.

EXPLANATION OF REFERENCE CHARACTERS 10 design parameter managing system
12 data base section
14 data managing section
14a three-dimensional CAD interface section (3D CAD I/F section)
14b two-dimensional CAD interface section (2D CAD I/F section)
14c separating section of geometrical information and attribute information
14d two dimension-three dimension geometrical converter (2D-3D geometrical converter)
16 external storage medium
16a 3D mechanism data
16b 2D electric data
16c geometrical information intermediate file (geometrical information intermediate File)
18 GUI (Graphical User Interface) display section
20 input section

BEST MODE FOR EMBODYING THE INVENTION

In the following, an example of the manner of practice of a design parameter managing method, a design parameter managing system, program and computer readable recording medium according to the present invention will be described in detail by referring to the accompanying drawings.

Besides, in the manner of practice which will be described hereinbelow, a two-dimensional CAD system and a three-dimensional CAD system are used as a plurality of different CAD systems wherein the two-dimensional CAD system is a two-dimensional electric CAD system and the three-dimensional CAD system is a three-dimensional mechanism CAD system.

FIG. 1 is a constitutional block diagram showing the design parameter managing system according to an example of the manner of practice of the present invention.

The design parameter managing system 10 is constituted to include a database section 12, a data managing section 14, an external storage medium 16, a GUI (Graphical User Interface) display section 18, and an input section 20.

In addition, the design parameter managing system 10 provided with the above-described database section 12, the data managing section 14, the external storage medium 16, the GUI display section 18, and the input section 20 may be realized by means of, for example, a computer system.

Hereupon, the database section 12 may be composed of a usual database such as RDB (relational database).

In the database section 12, shared states of each attribute information ("the attribute information" will be mentioned later) in the respective design parameters are separately registered and managed.

Namely, the database section 12 functions to register a variety of attribute information taken over from the data managing section 14 on the database, and to correlate with shared parameters being an object which is obtained by data-modeling the registered attribute information as a virtual shared state (hereinafter referred to as "shared object").

It is to be noted that the virtual shared state is not limited only to the data modeling based on object-orientation, but also it may be realized in a relationship between database tables in an RDB system.

Next, as a constitution relating to the present invention, the data managing section 14 is constituted to include a three-dimensional CAD interface section (3D CAD I/F section) 14a, a two-dimensional CAD interface section (2D CAD I/F section) 14b, a separating section of geometrical information and attribute information (hereinafter optionally referred simply to as "separating treatment section") 14c, and a two-dimensional-three-dimensional geometrical converter (2D-3D geometrical converter) 14d (The "geometrical information" will be described hereinbelow). In addition, the three-dimensional CAD interface section 14a and the two-dimensional CAD interface section 14b contain in a part thereof an input/output section (I/O) of the entity file of an OS (operating system).

Although it is not specifically shown, the data managing section 14 includes interface sections with respect to the GUI display section 18 and the input section 20, management sections (application sections) for respective treatments and the like.

It is to be noted that the data managing section 14 means specifically a program aggregation for realizing the above-described respective constitutions.

Here, the three-dimensional CAD interface section 14a is an interface for accessing to 3D mechanism data (the "3D mechanism data" will be mentioned later) to effect editing operations such as reading/writing the information inside the 3D mechanism. On one hand, the two-dimensional CAD interface section 14b is an interface for accessing 2D electric data (the "2D electric data" will be mentioned later) to effect editing operations such as reading/writing the information inside the 2D electric CAD system.

Next, the separating treatment section 14c will be described wherein it is a general format as a CAD data format in a two-dimensional CAD system and a three-dimensional CAD system to have usually both of geometrical information for indicating a physical figure and attribute information for holding some sort of meaning with respect to the geometrical information. The separating treatment section 14c functions to separate the geometrical information from the attribute information in a condition wherein a relevancy between the geometrical information being an object of the attribute information and the attribute information is maintained separately in order to convert mutually the geometrical information between the two-dimensional space and the three-dimensional space, more specifically either from the two-dimensional space to the three-dimensional space, or from the three-dimensional space to the two-dimensional space. Because of such separating treatment in the separating treatment section 14c, it becomes possible to interchange data between the two-dimensional CAD system and the three-dimensional CAD system being different in geometrical dimensions in Euclidean space.

As the attribute information, logical data such as electrical characteristic values, material physical properties which are given to positions (path information), constitutional points, planes, solid data and the like of an entity file become also the objects other than the above-described relevancy.

Then, the 2D-3D geometrical converter 14*d* converts the three-dimensional and the two-dimensional geometrical information into intermediate information for conversion by means of a preparing treatment of intermediate information for conversion after separating the CAD data in the two-dimensional CAD system and the three-dimensional CAD system into only the geometrical information. This is because there is necessity for converting the data into a format which can be understood by respective geometry engines for exchanging the data among different CAD kernels.

Thereafter, the 2D-3D geometrical converter 14*d* converts the intermediate information for conversion into two-dimensional geometrical information or three-dimensional geometrical information. More specifically, in the 2D-3D geometrical converter 14*d*, two-dimensional geometrical information is changed and converted into three-dimensional geometrical information, while three-dimensional geometrical information is converted into two-dimensional geometrical information.

Next, the external storage medium 16 may be composed of a usual storage device such as a HDD (hard disk drive).

In the external storage medium 16, the 3D mechanism data 16*a* being the entity file prepared in the three-dimensional mechanism CAD system being a three-dimensional CAD system, the 2D electric data 16*b* being the entity file prepared in the two-dimensional electric CAD system being a two-dimensional CAD system, and the geometrical information intermediate file (geometrical information intermediate File) 16*c* being the entity file prepared in the 2D-3D geometrical converter 14*d* are stored.

Next, the GUI display section 18 may be composed of, for example, a usual display device such as a CRT wherein a user interface is displayed.

Then, the input section 20 may be composed of, for example, a keyboard or a mouse wherein a user of the design parameter managing system 10 inputs a required instruction to the design parameter managing system 10 through the input section 20.

In the above construction, the operations in the above-described design parameter managing system 10 will be described.

In the design parameter managing system 10, first, the following respective parameters are set out.

More specifically, the items to be used as shared objects which are data-modeled as shared parameters, i.e. a virtually shared state from among design parameters are decided, and they are set out as the shared parameters with respect to the database section 12 of the design parameter managing system 10. Besides, the shared parameters are defined as the one being logical on the system.

Hereupon, as the items to be used for the shared parameters selected from among the design parameters, there are, for example, parts origin, parts number, parts position, material, board outline, limited region and the like.

Then, in order that the design parameter managing system 10 recognizes respective shared parameters from the CAD data in the 3D mechanism CAD system and the 2D electric CAD system, attribute correlation table (Matching Table) is registered to the database section 12, and the treatment for correlating the attribute information registered to the database section 12 with the shared parameters is conducted.

FIG. 2 shows an example of the attribute correlation table wherein the attribute information registered to the database section 12 has been correlated with the shared parameters. In the attribute correlation table shown in FIG. 2, the term "Instance Name" means the attribute information to be input directly to respective CAD data, and they are character strings to be attribute-given to geometries of lines or solids by means of the operations in the respective CAD systems.

It is to be noted that FIG. 6 is an explanatory view showing the attribute correlation table as shown in FIG. 2 in a tree structure, and further a relationship of the conversion between the 3D mechanism data 16*a* and the 2D electric data 16*b*.

An application example after completing the above-described setting and in case of applying the design parameter managing system 10 will be described hereinbelow.

(1) The First Step

First, from the three-dimensional mechanism CAD system, system-logon is made through the three-dimensional CAD interface section 14*a*. The design parameter managing system 10 accesses to the active CAD data which is file-opened, retrieves "mechanism CAD Instance Name" which has been set up in the attribute correlation table from among the three-dimensional CAD data of the three-dimensional mechanism CAD system now in accessing, and if it exists, the design parameter managing system 10 recognizes the geometrical information of the shared parameters correlated to the "mechanism CAD Instance Name". Since then, the geometrical information is managed as an object of a cooperation design mode, so that it is held under the management of the design parameter managing system 10.

The geometrical information other than the shared parameters is handled as geometrical information of non-shared parameters; and the latter is discriminated from the geometrical information which is set up in the cooperation design mode, so that the latter information is edited uniquely in the three-dimensional mechanism CAD system.

(2) The Second Step

Figure 3:
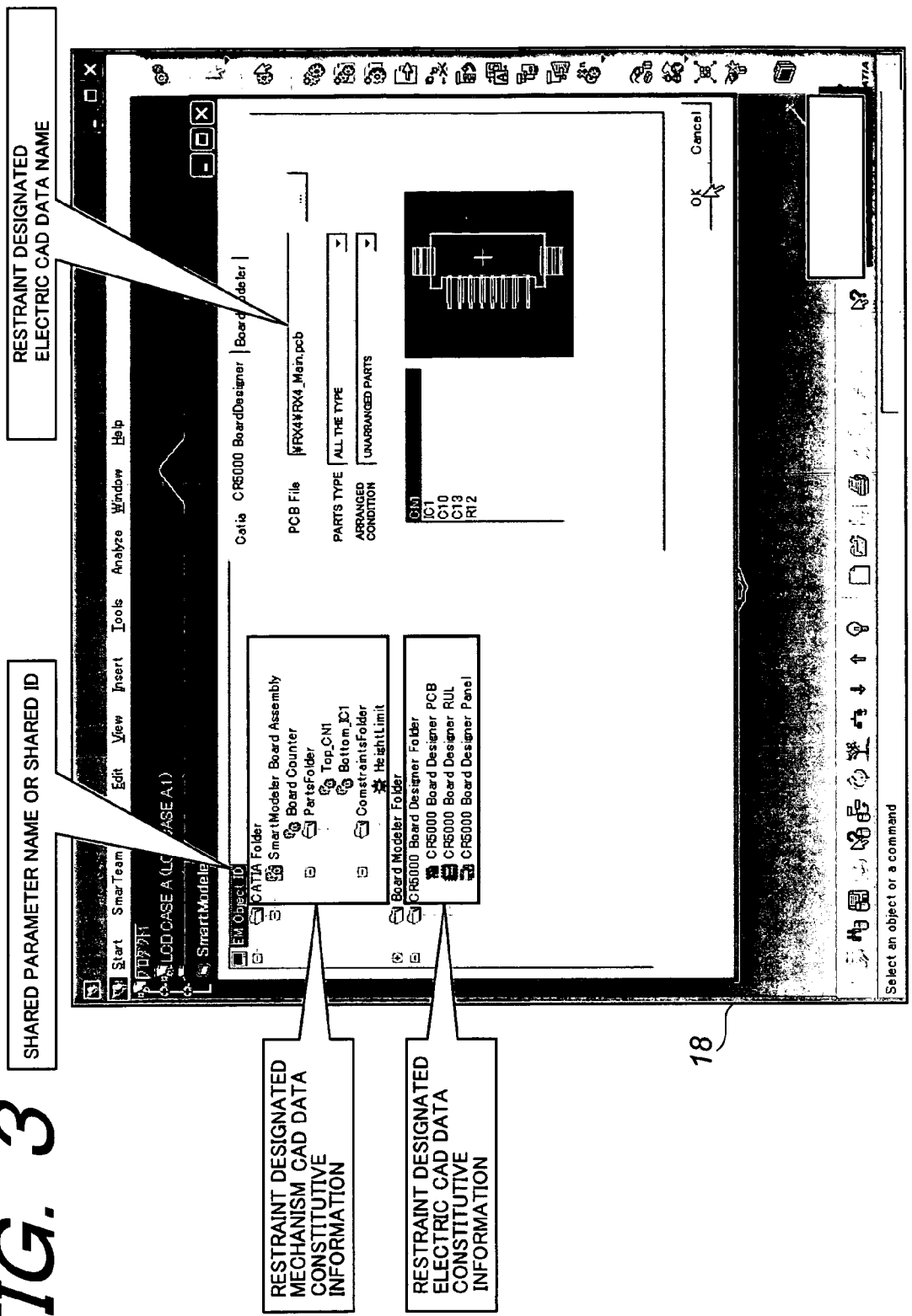
FIG. 3 is an explanatory view showing behaviors in the design parameter managing system according to an example of the manner of practice of the present invention.

Next, as shown in FIG. 3, the cooperation design setting dialogue is displayed on the GUI display section 18 in the logged-on condition to the design parameter managing system 10 to set up the two-dimensional CAD data in the two-dimensional electric CAD system being an object to be bundled. In this case also, the design parameter managing system 10 accesses to the inside of the two-dimensional CAD data in the two-dimensional electric CAD system through the two-dimensional CAD interface section 14*b* and acquires the geometrical information of the shared parameters correlated to the "electric CAD Instance Name" while referring to the attribute correlation table as in the case of the three-dimensional mechanism CAD system described in the above first step. In the present step, the 3D mechanism data and the 2D electric data are bundled through the shared parameters (shared objects).

(3) The Third Step

Figure 4:
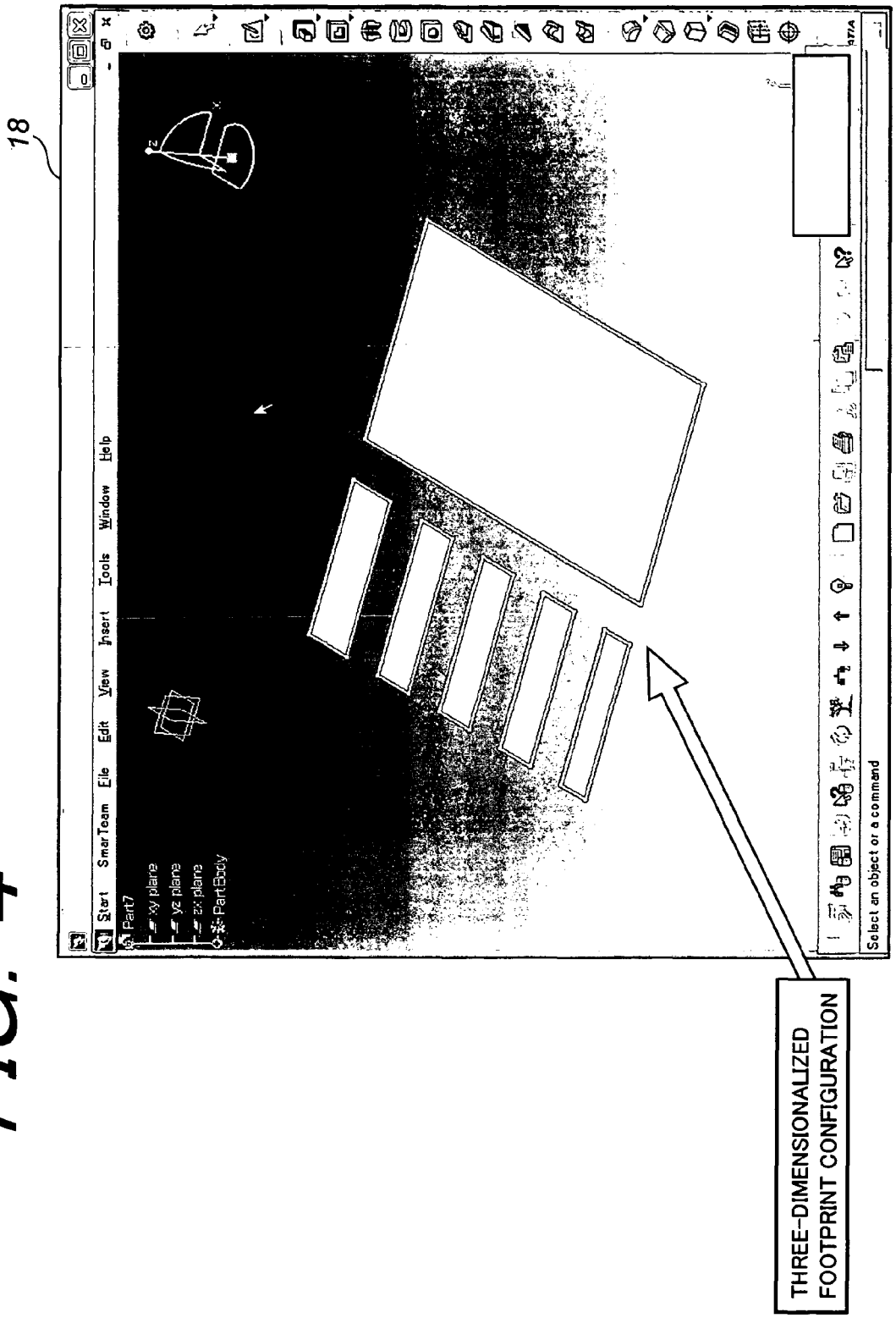
FIG. 4 is an explanatory view showing behaviors in the design parameter managing system according to an example of the manner of practice of the present invention.
Figure 5:
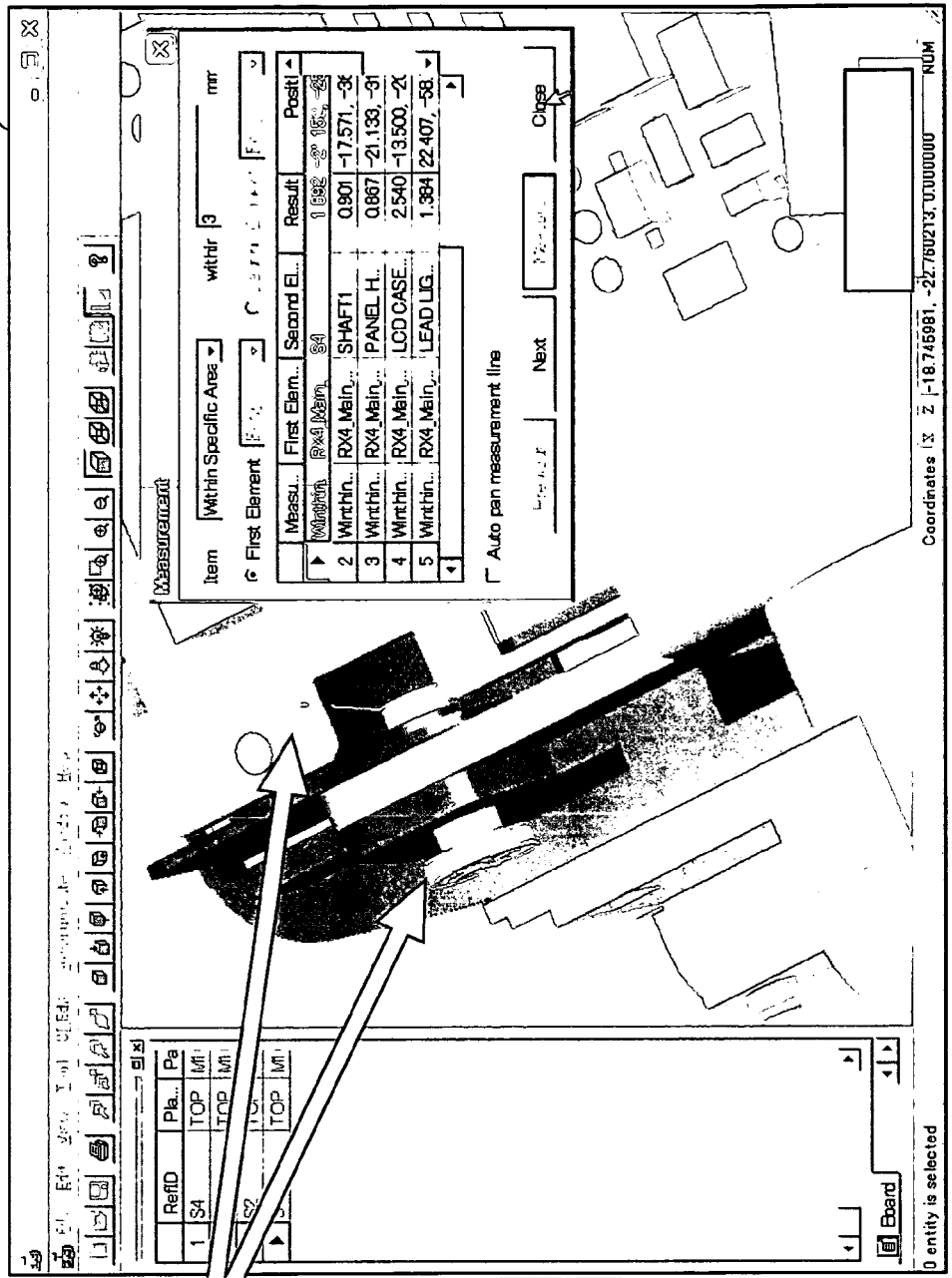
FIG. 5 is an explanatory view showing behaviors in the design parameter managing system according to an example of the manner of practice of the present invention.

As a result of such situation that the 3D mechanism CAD data and the 2D electric CAD data are bundled in the above-described second step, when the 2D-3D geometrical converter 14*d* in the design parameter managing system 10 is used with respect to the geometrical information shared in the mutual data bundled, it becomes possible to use three-dimensionally converted configuration information such as a Foot Print configuration in the two-dimensional electric CAD system by showing it on the three-dimensional mechanism CAD system for the design study as shown in FIG. 4; or it becomes possible to effect clearance verification specialized in electrical properties by reflecting the material information in the three-dimensional CAD data in the three-dimensional mechanism CAD system on the board data (two-dimensional CAD data) in the two-dimensional electric CAD system.

INDUSTRIAL APPLICABILITY

The present invention is applicable for a three-dimensional product design executed in the course of product development in the case when an electronic set manufacturer develops the products.

The invention claimed is:

1. A computerized design parameter managing method for managing design parameters used respectively in a two-dimensional CAD system and a three-dimensional CAD system, comprising:

performing computerized separation of two-dimensional CAD data and three-dimensional CAD data used, respectively, which has been inputted in the two dimensional CAD system and the three-dimensional CAD system into geometrical information and attribute information;

performing computerized setting up of arbitrary design parameters, by an inputting means for inputting direction of a designer, independently among design parameters used respectively in the two-dimensional CAD system and the three-dimensional CAD system into shared design parameters and non-shared design parameters, and providing the shared design parameters in a virtually shared state among the two-dimensional CAD system and the three-dimensional CAD system;

performing computerized correlation of the separated attribute information with the shared design parameters set up into the virtually shared state;

preparing an attribute correlation table, which correlates attribute information of shared design parameters of the two-dimensional CAD system and the attribute information of the three-dimensional CAD system through design parameters, regarding to the attribute information which is correlating the design parameter with a virtually shared state in the two-dimensional CAD data and the three-dimensional CAD data;

performing computerized accessing and recognizing of the separated attribute information correlated with the shared design parameters set up into the virtually shared state among two-dimensional CAD data and the three-dimensional CAD data used respectively in the two-dimensional CAD system and the three-dimensional CAD system;

performing, in a co-design mode, computerized management of geometrical information of the shared design parameters set up into the virtually shared state which are correlated with the accessed and recognized separated attribute information as objects with data compatibility in the two-dimensional CAD system and the three-dimensional CAD system;

separately and independently performing management of geometrical information of the non-shared design parameters which are not correlated with the accessed and recognized attribute information from the geometrical information which is performed to manage as objects with data compatibility in the two-dimensional CAD system and the three-dimensional CAD system;

retrieving existing attribute data in the attribute correlation table, recognizing geometrical information of the shared parameters correlated to the retrieved attribute data, and managing the geometrical information as an object of a cooperation design mode, wherein a relevancy between the geometrical information being an object of the attribute information and the attribute information is maintained separately; and performing bundling of the geometrical information of the two-dimensional CAD data in a virtually shared state and the geometrical information of the three-dimensional CAD data in a virtually shared state through design parameters based on the attribute correlation table, wherein three dimensional CAD data and two-dimensional CAD data are bundled for use in the two-dimensional CAD system and in the three-dimensional CAD systems;

converting mutually the geometrical information between the two-dimensional space and the three-dimensional space and in order to interchange data between the two-dimensional CAD system and the three-dimensional CAD system which differ in geometrical dimensions in Euclidean space; and displaying information of the three-dimensional CAD data and information of the two-dimensional CAD data simultaneously on one display for use in development of a product.

2. A computerized design parameter managing system for managing design parameters used respectively in a two-dimensional CAD system and a three-dimensional CAD system, comprising:

a computerized system component for separating two-dimensional CAD data and three-dimensional CAD data which has been inputted to the system, respectively, in the two-dimensional CAD system and the three-dimensional CAD system into geometrical information and attribute information;

a computerized system component for setting up arbitrary design parameters, by an inputting means for inputting direction of a designer, independently among the design parameters used respectively in the two-dimensional CAD system and the three-dimensional CAD system into shared design parameters and non-shared design parameters, and for providing the shared design parameters in a virtually shared state among the two-dimensional CAD system and the three-dimensional CAD system;

a computerized system component for correlating the separated attribute data with the shared design parameters set up into the virtually shared state;

a computerized system component for preparing an attribute correlation table, which correlates attribute information of shared design parameters of the two-dimensional CAD system and the attribute information of the three-dimensional CAD system through design parameters, regarding to the attribute information which is correlating the design parameter with a virtually shared state in the two-dimensional CAD system and the three-dimensional CAD system;

a computerized system component for accessing and recognizing the separated attribute data correlated with the shared design parameters set up into the virtually shared state among the CAD data used respectively in the two-dimensional CAD system and the three-dimensional CAD system;

a computerized system component for managing, in a co-design mode, geometrical information of the shared design parameters set up into the virtually shared state which are correlated with the accessed and recognized separated attribute data as objects with data compatibility in the two dimensional CAD system and the three-dimensional CAD system;

a computerized system component for separately and independently managing geometrical information of the non-shared design parameters which are not correlated with the separated attribute information from the geometrical information as objects with data compatibility:

a computerized system component for retrieving existing attribute data in the attribute correlation table, recognizing geometrical information of the shared parameters correlated to the retrieved attribute data, and managing the geometrical information as an object of a cooperation design mode, wherein a relevancy between the geometrical information being an object of the attribute information and the attribute information is maintained separately;

a computerized system component for performing bundling of the geometrical information of the two-dimensional CAD data in a virtually shared state and the geometrical information of the three-dimensional CAD data in a virtually shared state through design parameters based on the attribute correlation table, wherein three dimensional CAD data and two-dimensional CAD data are bundled for use in the two-dimensional CAD system and in the three-dimensional CAD systems;

a computerized system component for converting mutually the geometrical information between the two-dimensional space and the three-dimensional space and in order to interchange data between the two-dimensional CAD system and the three-dimensional CAD system which differ in geometrical dimensions in Euclidean space; and a display for displaying information of the three-dimensional CAD data and information of the two-dimensional CAD data simultaneously on one display for use in development of a product.

3. The computerized design parameter managing system as claimed in claim 2, further comprising:

a computerized registration component for registering arbitrary design parameters among the design parameters used respectively in the plurality of different CAD systems as the shared parameters among the plurality of different CAD systems to a database;

a computerized history managing component for managing a history between the design parameters used respectively in the plurality of different CAD systems and the shared parameters registered to the database by means of the registration means; and a computerized finite difference managing component for managing the finite differences between the design parameters used respectively in the plurality of different CAD systems and the shared parameters registered to the database by the registration means based on the history managed by the history managing means.

4. The computerized design parameter managing system as claimed in claim 3, further comprising:

a computerized notification component for notifying the plurality of different CAD systems of the finite differences managed by the finite difference managing means.

5. The computerized design parameter managing system as claimed in claim 2, further comprising:

a computerized preparation component adapted to prepare three-dimensional data in a condition where logical electric design information has been correlated to physical three-dimensional configuration information.

6. The computerized design parameter managing system as claimed in claim 2, further comprising:

a computerized component for preparing and managing an electronic parts data library which has been modeled in a three-dimensional configuration; and wherein the three-dimensional electronic parts data library are arranged so as to have parts origin information and material physical property information and so as to correlate the parts origin information and the material physical property information with the shared parameters set up in the virtually shared state.

7. A computer program embodied in or on a computerized readable medium for executing the design parameter managing method as claimed in claim 1 with respect to a computer.

8. A computerized design parameter managing system as claimed in any one of claims 2, 3, 4, 5 and 6, further comprising a computer program embodied in or on a computerized readable medium programmed for use in the design parameter managing system.

* * * * *